Aug. 26, 1969     N. A. WELCH ET AL     3,463,046

BLIND FASTENING RIVET AND METHOD OF MAKING SAME

Filed Dec. 11, 1967     3 Sheets-Sheet 1

INVENTORS
NICHOLAS A. WELCH
HARRY C. WENDT

BY *McCormick, Paulding & Huber*

ATTORNEYS

FIG. 12-A

United States Patent Office 3,463,046
Patented Aug. 26, 1969

3,463,046
BLIND FASTENING RIVET AND METHOD OF MAKING SAME
Nicholas A. Welch, West Hartford, and Harry C. Wendt, Farmington, Conn., assignors to Emhart Corporation, Bloomfield, Conn., a corporation of Connecticut
Filed Dec. 11, 1967, Ser. No. 689,520
Int. Cl. F16b 13/06, 33/04
U.S. Cl. 85—70                                    4 Claims

ABSTRACT OF THE DISCLOSURE

A hollow rivet and pull-stem assembly wherein the rivet is provided with a flange or head at its outer end and the inserted inner end portion of the stem is threaded and the end of the rivet body opposite the head has a plurality of circumaxially spaced longitudinally extending sections which are pressed into the stem threads to connect the stem and rivet and to form longitudinal inner end ribs on the rivet which help to form a desirable inner head on the rivet when the said inner end is forcefully moved toward the original or outer head.

BACKGROUND OF THE INVENTION

The invention pertains to that field of art embracing methods of making rivets and the rivets per se, particularly those which are adapted for blind fastening applications and which utilize a stem in an assembly with a hollow rivet, the stem being used in setting the rivet.

The known rivet constructions of this general type may be open or closed at the inner end. When an open end rivet is employed, the stem and internal inner end portion of the rivet may be threaded so that turning or forceful retraction of the stem draws the open end toward the work and toward the rivet head, or the stem can be provided with a relatively large head extending beyond the inner open end of the rivet body to simultaneously expand and draw said end toward the work and rivet head by forceful axial retraction of the stem without turning. When a closed end rivet is used, the inner end of the stem and the internal inner end portion of the rivet may also be threaded so that the rivet can be set by forceful retraction of the stem or the stem may be provided with a head around which the rivet body is formed so that forceful retraction of the stem causes rivet body enlargement. The last-mentioned type of rivet, however, is not available in steel.

More of the blind fastening rivet assemblies just mentioned combine the advantages of steel construction, a closed end for sealing the opening in the work and low cost of fabrication. Further, while such assemblies have been quite successful, they do not provide the most desirable body and inner head configuration when the rivet has been set.

SUMMARY OF THE INVENTION

In keeping with the present invention, either an open or closed end rivet can be used with an elongated pull-stem having threads formed along one end portion thereof which is to be thrust into the rivet body bore. Preferably, the said rivet body is initially provided in a cylindrical shape and without threads. Thus the rivet can be economically produced, preferably in steel, but in many other metals as well. The threaded end portion of the stem is thrust into the rivet body through the open ended head thereon; then the inner end portion of the rivet body is inserted into a multiple jaw collet or generally similar gripping device. The collet or other gripping device is then forcefully closed to press or crimp circumaxially spaced longitudinally extending end sections of the rivet body into at least some of the stem threads, thus threading the rivet body bore in a most economical manner. At the same time, a plurality of longitudinally extending ribs is formed externally on the inner end portion of the rivet body between the pressed-in sections.

These ribs strengthen the inner end of the rivet body and reinforce it as it is drawn toward the outer head of the rivet by the action of the pull-stem. In addition, they influence the configuration of the inner head, formed from that portion of the body between the inner work surface and the pressed-in portions at the end of the rivet, as follows:

(a) They force the circumferential enfoldment, which follows the initial radial bulging of the above-mentioned body section and will become the inner head at the conclusion of the setting process, in an outward radial direction so that the inner head will have a larger diameter than it would attain if the ribs were absent.

(b) They maintain a gap between the enfoldment and the pressed-in portions of the rivet body during setting which promotes folding and inhibits shearing of the rivet material.

During the above-described process of inner head formation, compressive stresses beyond the elastic limit of the rivet material are imposed on that section of the rivet body between the outer head and the inner pressed-in portions. This not only causes the inner head formation as described above, but also effects the body portion of the rivet within the workpiece as follows:

(a) The outside diameter of said body portion increases which causes the rivet to conform tightly to the hole provided for it even though said hole is somewhat larger than the initial rivet diameter.

(b) The rivet wall is thickened and the material is work-hardened which significantly increases the shear and tensile strength of the rivet.

The inner head formation and body enlargement and strengthening above described has been found to be very beneficial in the many applications of which the rivet is capable, including its use as a blind fastener.

BRIEF DESCRIPTION OF THE DRAWINGS

FIG. 12A is a view from the inner end showing the rivet when set as in FIGS. 11 and 12.

DESCRIPTION OF THE PREFERRED EMBODIMENT

Figure 1:
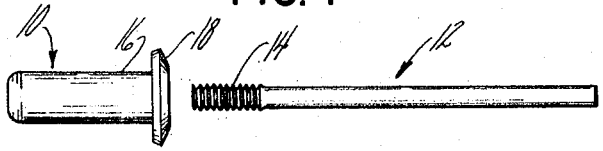
FIG. 1 is an elevational view showing a closed end rivet and a stem therefor prior to assembly.

In the various views of the drawings, the rivet is indicated generally by the reference number 10 and the pull-stem by the number 12. As seen in FIG. 1, the pull-stem is elongated and has an end portion 14 which is provided with a longitudinally extending series of interstices which may be generally annular grooves, but which are preferably provided as threads and which are preferably formed on the stem 12 by being rolled thereon so that the end portion 14 or the crest diameter of the threads formed thereon is of a greater diameter than the shank or remainder of the stem.

As also seen in FIG. 1, the rivet 10 shown therein is of the closed end type and has an initially cylindrical body 16 and a flanged head 18. The rivet also has an axial bore 20 (FIG. 5) extending through the head 18, this being a smooth bore extending from the said head to the closed end of the rivet. It will be recognized that the rivet 10 is adapted for economical production on conventional equipment such as eyelet machinery.

Figure 2:
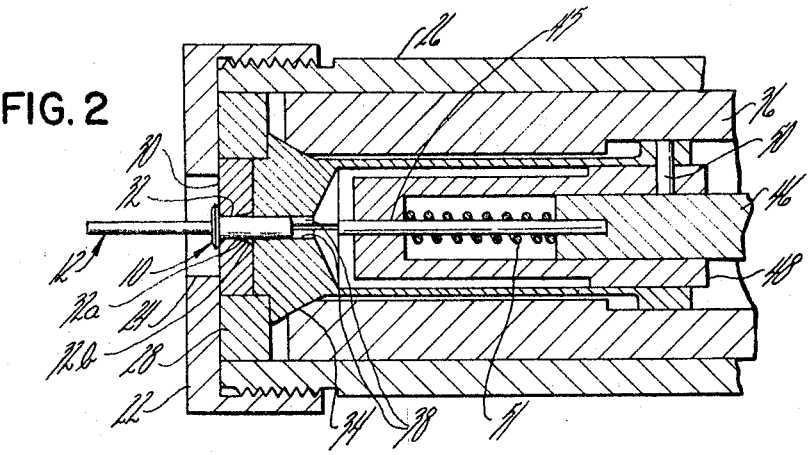
FIG. 2 shows the stem and rivet of FIG. 1 on reduced scale and with the stem thrust into the rivet and the rivet thrust into a fixture which may be utilized in crimping or pressing in the inner end portion of the rivet.

In the first step of forming the final rivet assembly, after the threaded portion 14 has been provided on the stem 12, the inner or threaded end portion of the stem is thrust into the bore 20 of the rivet 10 to the bottom thereof, and the rivet with inserted stem is then thrust closed-end-first into a forming fixture which may be of the type shown in FIG. 2. The said fixture includes a cap 22 which is generally cup-shaped and is internally threaded and which has a central opening 24 in its end. The said cap is threaded on the end of a cylindrical housing 26, and a thrust ring 28 is located within the housing 26 to butt against the cap 22 in concentric relationship therewith, the opening in the ring 28 being larger than the opening 24 in the said cap. An annular sizing die 30 is disposed within the opening of the thrust ring 28 adjacent the inner wall of the cap 22 and is provided with a central opening 32 which is accessible through the opening 24 in the cap 22. The central opening 32 in the sizing die has a diameter equal to or slightly greater than the diameter of the rivet body 16 so that the rivet and stem can be thrust closed-end-first into the fixture as shown in FIG. 2, the outer edge of the opening 32 having a slight radius to facilitate insertion of the rivet.

The picture also includes a conventional three-jaw split collet 34 having its closing end or head extending toward the cap 22. The said head is provided with a shoulder so that it will engage both the thrust ring 28 and the sizing die 30 as shown. The collet is relaxed or open and its relaxed jaw opening diameter is preferably slightly larger than the diameter of the opening 32 in the sizing die 30 so that the inner end portion of the rivet body 16 can be easily inserted into the jaw opening. The collet is closed on the inner end portion of the rivet to crimp it, as will be described, by an actuating sleeve 36 which, when moved from right to left as viewed in FIG. 2, engages the tapered outer surface of the collet head to close its jaws. When the sleeve 36 is again moved from left to right to the position shown in FIG. 2, the collet jaws will spring open to the position shown.

Figure 5:
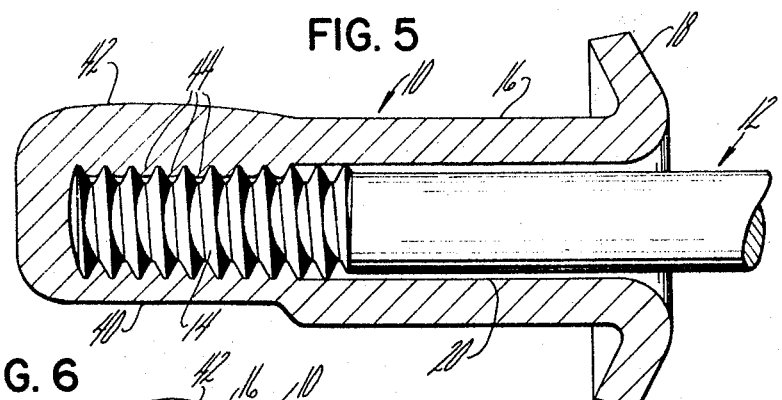
FIG. 5 is a much enlarged longitudinal sectional view of the assembly taken as indicated by the line 5—5 of FIG. 4.

The collet jaws are provided with arcuate, circumaxially spaced, rivet-engaging inner faces 38 which reshape the rivet body 16 by forming circumaxially spaced, longitudinally extending, pressed-in sections 40 on the inner end portion thereof, which sections are separated by longitudinally extending ribs 42. The pressed-in sections 40 of the rivet body 16 are work-hardened by the pressing or crimping, and the inner end portion of the body is pressed into the annular grooves or threads, or into at least some of them, on the inner end portion 14 of the stem 12 as shown in FIG. 5. Thus, internal threads 44 are economically formed in the inner end portion of the rivet bore 20.

Figure 3:
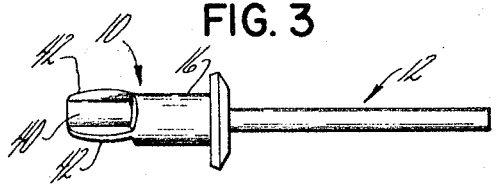
FIG. 3 is a view to the scale of FIG. 1 and is a side elevation showing the shape of the rivet after crimping in the aforesaid fixture but prior to removal therefrom.
Figure 4:
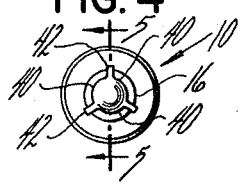
FIG. 4 is a left-hand end view of the assembly as shown in FIG. 3.

It will be observed in FIGS. 3–5 that the ribs 42 when initially formed extend radially outwardly beyond the surface of the remainder of the rivet body 16. Therefore, in order that the rivet will fit within an opening approximately equal to its initial diameter, the rivet is thrust back out through the opening 32 in the sizing die forcefully so that the ribs 42 are properly sized and take the general configuration shown in FIG. 6.

In order that this sizing operation will force the excess rib material back on itself without shearing material from the ribs 42, the inner end portion of the opening 32 in the sizing die is tapered as shown at 32a with the large end of the taper adjacent the face of the collet. In addition, the large end of the taper is provided with a radius 32b at its intersection with the inner face of the sizing die 30.

This radius and taper allow the excess material in the ribs 42 to be forced back on itself gradually instead of sheared off as the rivet is thrust back through the sizing die.

Figure 6:
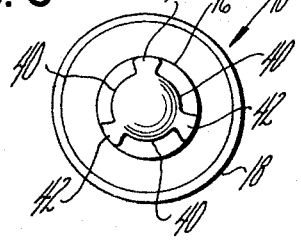
FIG. 6 is an end view similar to FIG. 4, but on larger scale, showing the assembly after it has been withdrawn from the fixture of FIG. 2.

The ribs are thus reformed so they are substantially flush with the remainder of the rivet body and their cross-sectional shape is changed to that of a broad keystone as shown in FIG. 6 instead of a narrow fin extending radially outwardly of the rivet body.

As shown in FIG. 4 the rib material is thus further work-hardened and strengthened.

Another important function of the sizing die 30 is to locate the unit in the proper position for crimping. This is accomplished by making the die of such thickness that when the outer head of the unit is engaged with the outer face of the die only that portion of the rivet body which it is desired to crimp extends into the collet.

The means included in the fixture of FIG. 2 for ejecting a crimped or pressed-in rivet therefrom includes a knock-out pin 45 mounted on the inner end of a plunger 46 which is reciprocable in a carrier 48 located in the bore of the collet 34. A pin 50 locks the carrier 48 in place within the collet and a spring 51 surrounds the knock-out pin 44 and is seated between the inner end of the carrier 48 and the plunger 46 to bias the plunger away from the inner end of a rivet 10 located in the die 30 and collet 34. However, when the plunger 46 is forcefully thrust from right to left, the knock-out pin 45 moves through the opening provided in the left-hand end of the carrier 48 to engage the inner end of the rivet 10 and to thrust it out of the fixture through the opening 32 in the sizing die 30.

Figure 7:
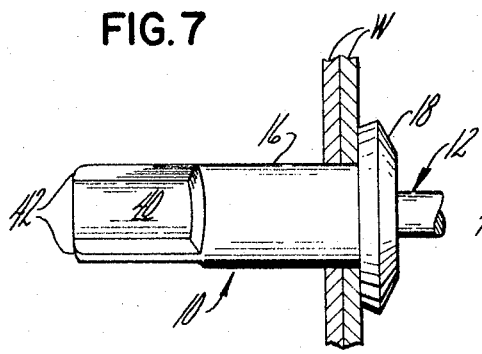
FIG. 7 shows the rivet assembly thrust through registering openings in a pair of plates which are to be fastened together.

When thrust from the fixture of FIG. 2, the rivet and pull-stem assembly appears as shown in FIGS. 6 and 7 and is ready to be used and set in a wide variety of installations. One such use is illustrated in FIG. 7 wherein the assembly is utilized as a blind fastener by thrusting the crimped or inner end of the rivet 10 through registering openings in a pair of workpiece plates W, W so that the outer head 18 of the rivet will engage the outermost plate. The size of the openings in the workpieces is not very critical. That is, the openings can be just large enough to receive the crimped end and body 16 of the rivet as shown, or they can be somewhat larger, because in either event the setting of the rivet will enlarge the body as permitted by the openings to secure the workpiece plates W, W together.

Known or conventional pull-stem blind rivet setting tools can be employed in setting either open end or closed end rivet assemblies provided in keeping with the present invention.

The tools most commonly used are provided with a hollow member adapted to abut the outer head of the rivet, said member being provided with a hole to receive the rivet pull-stem.

In use, a rivet is applied to the tool by inserting its pull-stem into the hole in the hollow member enough so the outer head of the rivet abuts the hollow member. When the operating mechanism is actuated, the jaws grip the pull-stem and draw it outwardly from the outer rivet head causing the inner head to form.

It can be seen that either an open end or closed end rivet in keeping with the present invention can be produced if a threaded horn, which would be part of the crimping apparatus, be substituted for the threaded pull-stem described. In this case, the rivet crimping operation would be exactly as described except that the first step would consist of thrusting the horn, instead of the pull-stem, into the rivet and the last step would consist of unscrewing the horn from the completed rivet. These operations would be automatically performed by the crimping apparatus.

The resulting rivet would be exactly as described except that it would lack a pull-stem.

It could be set by any of the following means:

(a) A reusable pull-stem could be screwed into the rivet and then the conventional tool as described could be used to set the rivet.

(b) A tool could be provided incorporating a permanent pull-stem so that the rivet would be screwed onto it prior to setting the rivet.

(c) A device which incorporated a permanent, rotatable, threaded pull-stem which screwed into the rivet and, through the action of its thread, against the mating thread in the rivet, forcefully retract the crimped end towards the outside head to form the inner head.

It will also be understood that rivet and pull-stem assemblies could be produced in accordance with the present invention in which the stem was threadably engaged with the pressed-in end portions of the rivet body a sufficient distance to allow proper inner head formation, but in which also, an extension of the pressed-in end portions with internal threads is provided which is not occupied, initially, by the threaded end of the pull-stem.

Such a rivet would be applied through the use of a tool incorporating a rotatable gripping device for rotating the pull-stem and means engageable with the outer head of the unit for restraining the rivet against rotation and axial movement.

In setting a rivet with such a tool, the pull-stem would be rotated so that it would screw into the unoccupied threaded extension of the pressed-in end portion of the rivet body and would therefore forcefully retract the inner end portion of the rivet, causing the formation of the inner head as above-described.

Figure 8:
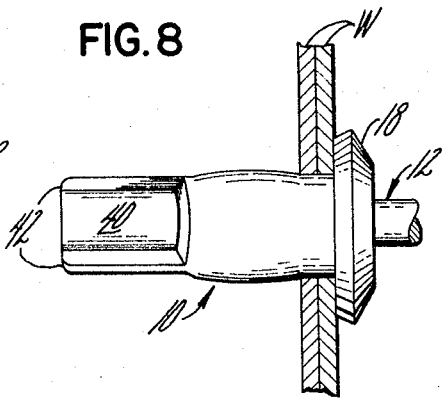
FIG. 8 is an elevational view similar to FIG. 7 showing the initial body enlargement of the rivet as it is being set to fasten the aforesaid workpieces.

In all of the above-described rivet forms contemplated by the present invention, during the very initial stages of forceful retraction of the stem 12 from the rivet 10, the rivet body 16 starts to loose its cylindrical configuration and to be enlarged. An early stage of such retraction is shown in FIG. 8 and it will be observed that the portion of the rivet body between the pressed-in sections 40 and the ribs 42 and the workpieces takes on a slight barrel shape.

Figure 9:
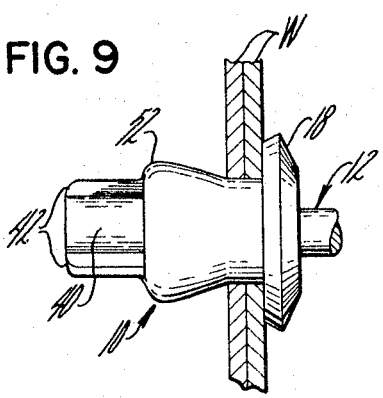
FIG. 9 is a further elevational view similar to FIG. 8 but showing the rivet in an intermediate set condition.
Figure 10:
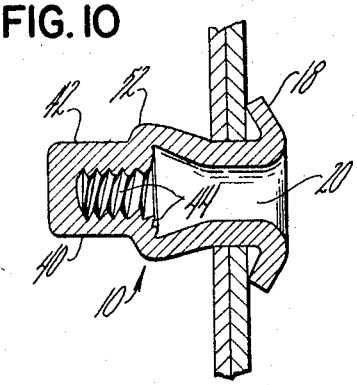
FIG. 10 is a longitudinal sectional view through the rivet as it is shown in FIG. 9, but with the pull-stem unthreaded and removed therefrom.

Continued retraction of the stem from the rivet as shown in FIG. 9 causes the start of an inner head formation on the rivet. That is, a massive body enlargement starts to take place in the area designated by the reference number 52. It will be seen that the massive radial enlargement 52 takes place immediately adjacent the pressed-in sections 40 and in fact the pressed-in sections contribute to the enlargement as can best be seen in FIG. 10 wherein the stem has been unthreaded and removed. As seen in FIG. 10, some of the internal threads 44 on the pressed-in section 40 are seen to be turned into the radial enlargement. In all stages of body enlargement shown in FIGS. 8, 9 and 10, the body has enlarged sufficiently to very securely clamp the workpieces W, W together, filling the openings in said workpieces so snugly that an effective seal is created. Further, at any such stage of rivet setting and body enlargement, the setting operation can be stopped and the stem 12 unthreaded from the rivet 10 to leave a threaded socket therein as shown in FIG. 10.

Figure 11:
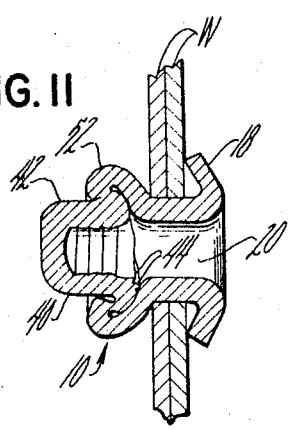
FIG. 11 is a further longitudinal sectional view showing the rivet of FIGS. 7–10 as it appears when fully set and and after the stem has been extracted from the rivet by stripping the threads.
Figure 12:
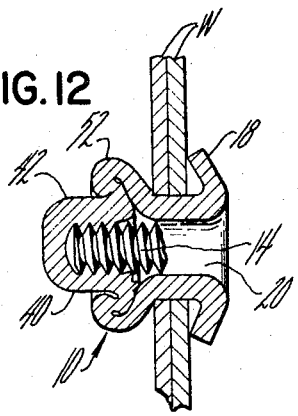
FIG. 12 shows the same rivet fully set as it appears when the stem has snapped off after setting of the rivet.

The forceful retraction of the stem from the rivet can be continued until the inner head is fully formed and the rivet finally set and the stem is fully retracted from the rivet or broken off within the rivet as shown in FIGS. 11 and 12, respectively. In either event, and as shown in both FIGS. 11 and 12, the enlargement 52 reaches its greatest radial dimension and massive development. It will be seen that in the final setting of the rivet, a portion of each pressed-in section 40 and each accompanying rib 42 is involved in the formation of the enlargement 52. It will also be seen that there is some telescoping or interfolding in the enlargement. Examination of the inner head as shown in FIGS. 12 and 12A reveals a gap between the pressed-in sections and the enfoldment which occurs because the ribs have forced the enfoldment radially outward during their axial motion. The gap is widest adjacent the ribs and least midway therebetween. This increases the diameter of the inner head over what it would be were the ribs absent. The gap promotes material folding and inhibits shearing of the material forming the inner head. When the stem 12 is made to be sufficiently strong so as not to snap, but to be fully retracted from the rivet 10 as shown in FIG. 11, it strips the inner threads 44 in the bore of the rivet and leaves a rather smooth socket therein. In those cases where the pull-stem breaks before it is fully retracted from the set rivet, the breakage occurs, as would be expected, at the root section between adjacent threads of the threaded end portion 14 of the stem, as shown in FIG. 12. In either event, the shear strength of the set rivet is enhanced by the work-hardening of the rivet body which occurs as it is telescoped and formed to shape the inner head including the massive enlargement 52.

Figure 13:
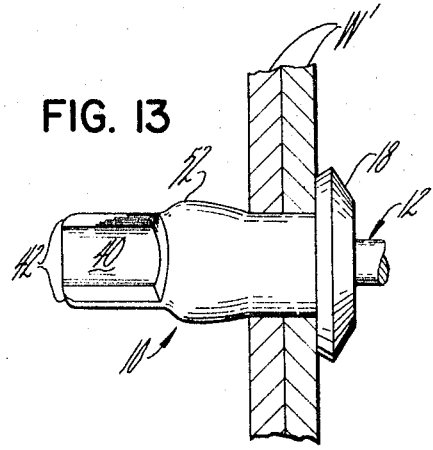
FIG. 13 is an elevational view showing the rivet inserted in a thicker or heavier work installation and showing the initial body enlargement during an early stage of setting.
Figure 14:
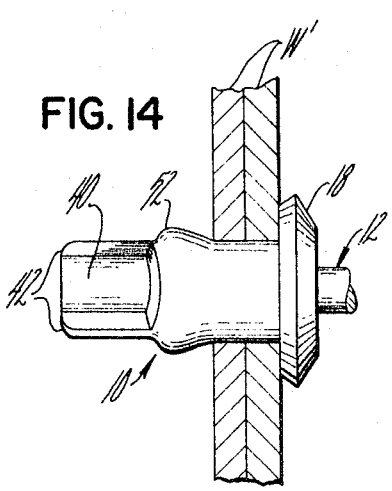
FIG. 14 is an elevational view showing the same rivet in the same work at an intermediate set condition.
Figure 15:
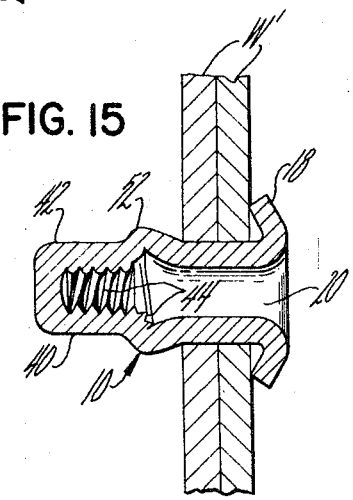
FIG. 15 is a longitudinal sectional view through the rivet as shown in FIG. 14, but with the stem unthreaded and removed therefrom.

FIGS. 13–17 illustrate the previously described setting stages of the rivet 10 by retraction of the stem 12 when applied through registering openings in two relatively thick workpiece plates W', W'. In an early stage of setting as shown in FIG. 13, the massive enlargement 52 starts to take form adjacent the pressed-in sections 40 and the ribs 42 and the whole body is enlarged between such sections and the workpiece and the head of the rivet as permitted by the workpiece openings. In a later stage of the setting, as shown in FIGS. 14 and 15, the radial enlargement 52 is more pronounced. It is at such an intermediate stage that the stem 12 can be most conveniently unscrewed from the rivet to leave a threaded socket in place for special installations and uses.

Figure 16:
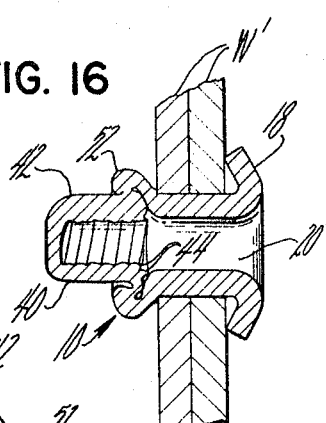
FIG. 16 shows the rivet fully set in the workpieces and with the stem extracted by stripping the threads.
Figure 17:
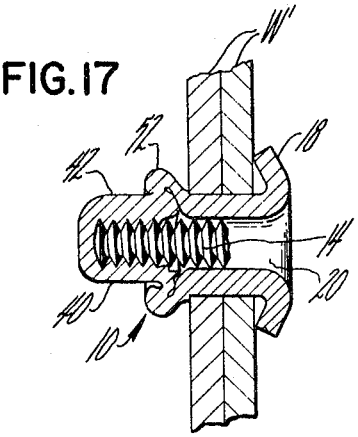
FIG. 17 is a longitudinal sectional view similar to FIG. 16 wherein the stem has snapped off after the rivet has been set.
Figure 17:
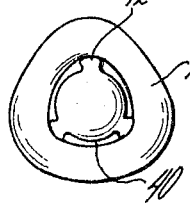

In the final setting of the rivet with the thicker workpieces as shown in FIGS. 16 and 17, the radial enlargement 52 will be seen not to assume the massive proportions obtained with thinner workpieces, but there is still some telescoping or interfolding of the rivet end within the rivet body in forming the enlargement 52 as shown.

The gap previously described is correspondingly reduced, but nevertheless promotes folding and inhibits shearing. Here again, the stem can be fully forcefully retracted to strip the threads 44, as shown in FIG. 16, or the stem can be broken to leave a section within the rivet as shown in FIG. 17.

The invention claimed is:

1. The method of constructing a fastener capable of blind fastening installation in a workpiece opening from a rivet having a body and a head at one end and an axial bore extending through the head and also from an elongated stem that can be thrust into the rivet bore, comprising the steps of forming a longitudinally extending series of grooves around one end portion of the stem, thrusting said one end portion of the stem into the bore to be disposed adjacent the other end of the rivet, thrusting said other end of the rivet through an opening in a sizing die and gripping it by a multiple jaw device to press a plurality of circumaxially spaced longitudinally extending sections of the rivet body into at least some of said grooves and thereby forming longitudinal ribs between said pressed in sections which extend outwardly beyond the body of the rivet, and then thrusting the rivet back through said opening in the sizing die to reform said ribs so that they will not extend outwardly beyond the body of the rivet.

2. The method according to claim 1 wherein said sizing die is located with respect to said multiple jaw device to gauge the longitudinal extent to which said device will grip the rivet, and wherein the grooves formed in said one end portion of the stem are formed as threads.

3. A hollow rivet and pull-stem assembly for blind fastening and the like comprising a rivet having a head and a body provided with an axial bore extending through the head, and an elongated stem inserted in the rivet bore and having an outer portion projecting from the rivet head, the inner end portion of the stem being provided with a longitudinally extending series of threads therearound, a plurality of circumaxially spaced longitudinally extending sections on the end portion of the rivet body opposite the head being formed on a lesser diameter than the remainder of the rivet body by being forced into and engaging in at least some of said threads and defining a plurality of circumaxially spaced longitudinally extending ribs therebetween which do not extend radially outwardly beyond said remainder of the rivet body, whereby the initiation of forceful axial retraction of the stem from the rivet causes enlargement of the body diameter of the rivet between the said longitudinal sections and the head as permitted by the opening in a workpiece into which the rivet body has been thrust, put with a greater enlargement occurring between said sections and the workpiece, and continuation of such forceful retraction causes formation of an inner head on the rivet body including a massive radial enlargement adjacent said sections.

4. The blind fastening assembly defined in claim 3 wherein the end of the rivet body opposite the head is closed, and there are at least three in the plurality of circumaxially spaced longitudinally extending sections on the rivet body engaging in said threads.

References Cited

UNITED STATES PATENTS

| 877,390 | 1/1908 | Wille | 10—27 |
|---|---|---|---|
| 2,030,171 | 2/1936 | Huck | 85—70 |
| 2,369,670 | 2/1945 | Gookin | 85—77 |
| 2,762,252 | 9/1956 | Karitzky | 85—71 |
| 2,803,984 | 8/1957 | Swenson | 85—70 |
| 3,006,003 | 10/1961 | Johnson. | |
| 3,030,705 | 4/1962 | Gill | 85—70 |
| 3,181,338 | 5/1965 | Zetterlund | 85—70 |
| 3,178,989 | 4/1965 | Siebol | 85—71 |
| 3,230,818 | 1/1966 | Siebol | 85—71 |
| 3,300,798 | 1/1967 | York | 85—77 |

FOREIGN PATENTS

| 241,038 | 4/1960 | Australia. |
|---|---|---|
| 590,054 | 1/1960 | Canada. |
| 22,402 | 8/1957 | Germany. |
| 1,017,778 | 10/1952 | France. |
| 1,241,123 | 8/1960 | France. |

MARION PARSONS, Jr., Primary Examiner

U.S. Cl. X.R.

10—27; 29—510, 517, 523, 526; 151—41.72